US009936806B2

(12) United States Patent
Taylor, Jr.

(10) Patent No.: US 9,936,806 B2
(45) Date of Patent: Apr. 10, 2018

(54) STORAGE CHEST (71) Applicant: James Earl Taylor, Jr., Baypoint, CA (US)

(72) Inventor: James Earl Taylor, Jr., Baypoint, CA (US)

( * ) Notice: Subject to any disclaimer, the term of this patent is extended or adjusted under 35 U.S.C. 154(b) by 0 days.

(21) Appl. No.: 14/581,451

(22) Filed: Dec. 23, 2014

(65) Prior Publication Data

US 2016/0174705 A1 Jun. 23, 2016

(51) Int. Cl.
| | |
|---|---|
| *B65D 19/02* | (2006.01) |
| *A47B 67/00* | (2006.01) |
| *B60B 33/00* | (2006.01) |
| *A47B 55/00* | (2006.01) |
| *B65D 6/00* | (2006.01) |
| *A47B 47/04* | (2006.01) |
| *F16B 13/00* | (2006.01) |
| *F16B 13/08* | (2006.01) |
| *A47B 47/00* | (2006.01) |
| *B65D 6/34* | (2006.01) |
| *B65D 6/16* | (2006.01) |
| *B65D 6/02* | (2006.01) |
| *B65D 8/00* | (2006.01) |

(52) U.S. Cl.
CPC .............. *A47B 67/00* (2013.01); *B60B 33/00* (2013.01); *A47B 47/0041* (2013.01); *A47B 47/04* (2013.01); *A47B 47/047* (2013.01); *A47B 55/00* (2013.01); *B65D 9/00* (2013.01); *B65D 9/02* (2013.01); *B65D 9/06* (2013.01); *B65D 9/12* (2013.01); *B65D 9/32* (2013.01); *B65D 9/34* (2013.01); *F16B 13/00* (2013.01); *F16B 13/08* (2013.01)

(58) Field of Classification Search
CPC ... A47B 47/0041; A47B 47/04; A47B 47/047; A47B 67/00; A47B 55/00; B65D 9/12; B65D 9/00; B65D 9/02; B65D 9/06; B65D 9/32; B65D 9/34; F16B 13/00; F16B 13/08; B60L 33/00
USPC ........ 220/668, 676, 4.28; 217/122, 12 R, 40, 217/42, 43 R, 51
See application file for complete search history.

(56) References Cited

U.S. PATENT DOCUMENTS

| 124,366 | A | * | 3/1872 | Marvil | B65D 85/34 |
| | | | | | 217/40 |
| 265,083 | A | * | 9/1882 | Horsey | B65D 9/32 |
| | | | | | 217/36 |
| 428,642 | A | * | 5/1890 | Sites | B65D 7/14 |
| | | | | | 16/373 |

(Continued)

*Primary Examiner* — J. Gregory Pickett
*Assistant Examiner* — Elizabeth Volz
(74) *Attorney, Agent, or Firm* — Orrick, Herrington & Sutcliffe LLP; Joseph A. Calvaruso (57) ABSTRACT

A storage chest has a base, a plurality of rails coupled to the base, and a side panel at each side coupled to the base between the rails. The base further includes a front panel coupled to the base between the side panel, a rear panel coupled to the base on a side opposite the front panel and between the side panels, and a cover movably coupled to the storage chest and configured to move from a closed position fully extending over the storage chest and substantially parallel to and opposite the base to an open position exposing an interior of the storage chest. The side, front, and rear panels and rails define openings providing access from an area exterior to the storage chest to the interior of the storage chest.

20 Claims, 5 Drawing Sheets

(56) References Cited

U.S. PATENT DOCUMENTS

| | | | | |
|---|---|---|---|---|
| 484,059 A | * | 10/1892 | Sites | B65D 7/14 16/227 |
| 706,022 A | * | 8/1902 | Clement | B65D 9/12 217/43 R |
| 1,094,463 A | * | 4/1914 | Munohausen | B65D 85/34 217/40 |
| 1,164,502 A | * | 12/1915 | Griffith | B65D 7/26 206/511 |
| 1,172,307 A | * | 2/1916 | Pearce | B65D 9/12 217/12 R |
| 1,226,875 A | * | 5/1917 | Fooks | B65D 85/34 217/40 |
| 1,241,122 A | * | 9/1917 | Johnsen | B65D 9/12 100/1 |
| 1,453,005 A | * | 4/1923 | Considine | B65D 7/14 217/36 |
| 1,705,003 A | * | 3/1929 | Crosley | B65D 9/18 217/43 R |
| D78,617 S | | 5/1929 | Duke | |
| 2,003,717 A | * | 6/1935 | Leghorn | B65D 9/38 217/12 R |
| D153,373 S | | 4/1949 | Metro | |
| 2,726,095 A | * | 12/1955 | Emery | B62B 3/00 217/43 R |
| D190,999 S | | 8/1961 | Mykleby | |
| 3,007,597 A | * | 11/1961 | Morrison | B65D 9/12 220/4.28 |
| D204,401 S | | 4/1966 | McCartney | |
| 3,400,485 A | | 9/1968 | Callin | |
| 4,103,455 A | | 8/1978 | Silvey | |
| D252,718 S | | 8/1979 | Taylor | |
| D282,032 S | | 1/1986 | Lemmeyer | |
| D282,795 S | | 3/1986 | Densen | |
| D296,853 S | | 7/1988 | Slater | |
| D321,613 S | | 11/1991 | Gandy | |
| D324,085 S | | 2/1992 | Mortes | |
| D328,676 S | | 8/1992 | Miller | |
| D329,747 S | | 9/1992 | Embree | |
| 5,207,343 A | * | 5/1993 | Bogadi | B65D 21/083 217/12 R |
| D350,284 S | | 9/1994 | Ran | |
| 5,386,919 A | * | 2/1995 | Long | B65D 9/16 217/36 |
| D357,103 S | | 4/1995 | Teifel | |
| D361,220 S | | 8/1995 | Cacciola | |
| D365,701 S | | 1/1996 | Keola | |
| D381,223 S | * | 7/1997 | Brunner | D6/664 |
| D397,398 S | | 8/1998 | Bro | |
| D407,898 S | | 4/1999 | Pulvino | |
| 6,076,690 A | * | 6/2000 | Hemmerly | B65D 19/16 206/600 |
| 6,837,556 B1 | * | 1/2005 | Hendy | A47B 47/045 312/257.1 |
| D504,707 S | | 5/2005 | Gleso et al. | |
| D513,872 S | | 1/2006 | Moore | |
| 8,689,992 B2 | * | 4/2014 | Anderson | A47C 1/14 217/12 R |
| 9,044,086 B1 | * | 6/2015 | Johnston | A47B 63/02 |
| 2004/0108303 A1 | * | 6/2004 | Wang | B65D 9/10 217/122 |
| 2015/0069077 A1 | * | 3/2015 | Monk | D06F 95/002 220/810 |

\* cited by examiner

STORAGE CHEST

FIELD

Aspects of the present invention relate to a storage chest, and more particularly, to a storage chest having improved safety features.

BACKGROUND

Conventional storage chests, trunks, and/or boxes (together, "storage chests") for the storage of materials, supplies, toys, clothing, linens, etc., generally have minimal to no visibility of the contents within the storage chest without the lid or cover of the storage chest being open. Some conventional storage chest models may include a glass or plastic view of the inside of the unit, however, the inside of the storage chest is not actually accessible unless the lid or cover is opened. Often, users of these storage chests, including adults, small children, or those with mobility challenges may experience difficulty accessing the contents stored within the storage chest, or may have accidents, including falling into or being trapped inside these conventional storage chests with limited means of egress or ability to be seen or heard from within the storage chest. These types of users, especially children and those with limited mobility, may experience injury as a result of unsupervised or unassisted use of these conventional storage chests. Moreover, conventional storage chests are often heavy and difficult to maneuver due to the quantity and type of materials used as well as the overall design of these storage chests.

SUMMARY

Aspects of the present invention relate to a storage chest or container, and more particularly, to a storage chest or container having improved safety features.

According to an embodiment, a storage chest includes a base, a base and a peripheral wall extending from the base and defining an interior of the chest. The peripheral wall includes a rail member extending from the base and defining an opening in the peripheral wall providing access between an area outside the chest to the interior of the chest. The storage chest further includes a cover disposed on the peripheral wall opposite the base and configured to close the chest.

The peripheral wall of the storage chest may include a plurality of rail members extending from the base.

The storage chest may further include a top support ring coupled to the peripheral wall below the cover.

The peripheral wall of the storage chest may further include a front panel and a rear panel at opposite sides of the base and a side member at each remaining opposite side of the base.

The base of the storage chest may define a series of openings configured to receive and couple to the peripheral wall.

The base, the peripheral wall, the rail member, and the cover of the storage chest may be made of a plywood, reclaimed wood, reinforced polyurethane foam, particle board, composite wood or lumber, or other reinforced building material.

A storage chest, according to another embodiment of the present invention, includes a base, a plurality of rails extending from the base, a pair of side panels extending from the base, each side panel being disposed between a pair of rails, a front panel extending from the base and disposed between the side panels, and a rear panel, spaced from the front panel and being disposed between a pair of rails. The side, front, and rear panels and rails define openings providing access from an area exterior to the chest to the interior of the chest.

The storage chest may further include a cover disposed on the side, front, and rear panels and rails opposite the base and configured to close the chest.

The side, front, and rear panels, the base, the rails, and the cover of the storage chest may be made of a plywood, reclaimed wood, reinforced polyurethane foam, particle board, composite wood or lumber, or other reinforced building material.

The storage chest may further include a top support ring coupled to the side, front, and rear panels and rails from a top of the storage chest. The top support ring may define a series of openings configured to receive a respective one of the plurality of rails at a top of each rail. The base may define a complementary series of openings configure to receive a respective one of the plurality of rails at a bottom of each rail.

A storage chest, according to another embodiment of the present invention, includes a base having a front side, a rear side opposite the front side, and two sides perpendicular the front and rear sides, a plurality of rails coupled to the base at the sides, a side panel at each of the two sides and coupled to the base at least between some of the rails of the plurality of rails, a front panel and a rear panel coupled to the front and rear sides, respectively, of the base, and a cover movably coupled to the storage chest and configured to move from a closed position fully extending over the storage chest and opposite the base to an open position exposing an interior of the storage chest. The base may define a series of partial openings configured to receive a respective one of the plurality of rails at a bottom of each rail.

The plurality of rails of the storage chest may include twenty rails configured in a pattern, with ten rails spanning each of the two sides and having a side panel interposed between each set of five rails such that a first rail is adjacent a side panel and a fifth rail is adjacent either the front panel or the rear panel at each side. Each of the rails may be spaced no greater than approximately four inches apart from its adjacent rail or side, front, or rear panel.

Each of the rails of the storage chest may be spaced approximately two inches apart from its adjacent rail or side, front, or rear panel.

The base, plurality of rails, each side panel, the front panel, the rear panel, and the cover of the storage chest may be made of a lightweight durable material.

The lightweight durable material of the storage chest may be a plywood, reclaimed wood, reinforced polyurethane foam, particle board, composite wood or lumber, or other reinforced building material.

The storage chest may further include a top support ring coupled to the plurality of rails, each side panel, the front panel, and the rear panel from a top of the storage chest, the top support ring defining a series of partial openings configured to receive a respective one of the plurality of rails at a top of each rail, and wherein the plurality of rails, each side panel, the front panel, and the rear panel are coupled to the top support ring with a fastening mechanism.

The fastening mechanism of the top support ring of the storage chest may be a screw, a nail, a bolt, glue, or putty.

The cover of the storage chest may be movably coupled to the storage chest at the rear panel with a first hinge. The cover may further include a handle configured to assist with moving the cover between and open and a closed position.

The cover of the storage chest may further include a second hinge configured to allow the cover to temporarily stay fixed in an open position, the second hinge being coupled to the cover and the rear panel.

The storage chest may further include a caster support at the bottom of the base spanning the two sides of the storage chest, and a plurality of casters configured to be coupled to a bottom of each respective caster support such that the storage chest is movable as a unit.

BRIEF DESCRIPTION OF THE DRAWINGS

These and other features and advantages of embodiments of the present invention will become more apparent by reference to the following detailed description when considered in conjunction with the following drawings. In the drawings, like reference numerals are used throughout the figures to reference like features and components. The figures are not necessarily drawn to scale.

The inventive subject matter disclosed herein can take form in various components and arrangements of components, and in various steps and arrangements of steps. The drawings are only for purposes of illustrating embodiments and are not to be construed as limiting. Further, it is to be appreciated that the drawings may not be to scale.

Embodiments of a storage chest according to the present invention are described herein with reference to the following figures. The same reference numerals are used throughout the figures to reference like features and components.

DETAILED DESCRIPTION

The detailed description set forth below in connection with the accompanying drawings is intended as a description of embodiments of a storage chest, as provided in accordance with the present invention, and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like reference numerals are intended to indicate like elements or features. Moreover, the sizes of the layers and regions in the drawings may be exaggerated for convenience of explanation.

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the embodiments presented herein.

Aspects of the present invention relate to a storage chest, and more particularly, to a storage chest having improved safety features and a lighter-weight overall application.

According to an embodiment of the present invention illustrated in FIGS. 1-5, a storage chest 100 having improved safety features includes a plurality of rails or rail members (hereinafter used interchangeably) 120. A plurality as used herein and throughout means more than one. The storage chest 100 is configured such that at least a portion of each side of the storage chest 100 includes rails 120 in lieu of solid paneling. In some embodiments, the rails 120 are part of a peripheral wall 130. The rails 120 are spaced apart from adjacent rails 120 or other panels 130, 140, or 150 such that the interior of the storage chest 100 may be accessible through the rails from an outside of the storage chest 120 even when its cover 170 may be closed. However, the rails 120 are also configured such that a user accessing the contents on an inside 180 of the storage chest 100 from outside cannot fit through the rails 120 to have his or her head, limbs, or other body parts caught within the inside 180 of the storage chest 100 in this position. Accordingly, the rails 120 according to an embodiment, are spaced approximately 4 inches or less apart from adjacent rails or panels 130, 140, or 150 (such that a 4-inch ball cannot pass between the openings). In another embodiment, the rails 120, are spaced ranging from approximately 1 inch to 3 inches apart from adjacent rails 120 or panels 130, 140, or 150.

The storage chest 100 according to this embodiment includes a base 110 constituting a bottom of the storage chest 100. The base 110, according to these embodiments, includes a series of openings 200. The base 110, according to embodiments of the present invention, can have any shape suitable for use as a storage chest 100. In an embodiment, the base 110 is rectangular. In other embodiments, the base 110 may be elliptical, ovular, circular, octagonal, hexagonal, pentagonal, or any other shape known and appreciated to those skilled in the art. In an embodiment, for example as shown in FIGS. 1-4, the base 110 may be rectangular in shape having two opposite sides and two rounded opposite short sides. In this embodiment, the base 110 includes a series of openings 200 along its rounded short sides and extending partially into the long sides such that at least a portion of each rounded short side includes openings 200 at the base. The openings 200 are configured to receive the rails 120 to couple to the base 110. Each opening 200 may be a full through-opening or a partial opening (only open on one, top surface of the base 110). The openings 200, in this embodiment, are spaced to each receive a rail 120 such that the distance between adjacent rails 120 does not exceed 4 inches. In another embodiment, the openings 200 are spaced so that the distance between adjacent rails 120 does not exceed 2 inches.

The base 110, according to an embodiment, is further configured to couple to two side panels or peripheral walls (hereinafter used interchangeably) 130, a front panel 140, and a real panel 150. The front panel 140 and the rear panel 150 are each configured to couple to the base 110 at the edge of each of the respective long sides (in an embodiment where the base 110 has long and short sides), or are each configured to couple to the base 110 at two opposite sides of the base 110 in embodiments where the base shape is non elongated or rectangular. The front and rear panels 140 and 150 can be coupled to the base 110 in any manner known and appreciated by those skilled in the art. For example, according to some embodiments, the front and rear panels 140 and 150 may be coupled to the base 110 using fasteners 220 including screws, nails, bolts, glue, or putty. In an embodiment, the front and rear panels 140 and 150 may each be fastened to the base 110 using fasteners 220 secured from a bottom surface of the base 110 into each respective panel 140 and 150. The front and rear panels 140 and 150, according to these embodiments, are configured to be placed in elevation and assembled with the base 110 such that each panel 140 and 150 spans almost an entire length of each long side of the base 110, constituting the front and rear height or depth of the storage chest 100 when viewed in elevation. Each of these panels 140 and 150 is further configured to receive a rail 120 adjacent each end of the panel 140 and 150 along the length of the long side with a corresponding opening 200 in the base 110 to receive the rail 120. Accordingly, the front and rear elevations of the storage chest 100, in an embodiment, each includes a panel 140 or 150 centered along a length of the side, and a rail 120 adjacent either end of the panel 140 or 150 spaced less than or equal to 4 inches from the panel 140 or 150. The storage chest 100 has at least one front panel 140 and at least one rear panel 150 on each of its opposite sides (i.e., at least two panels—one front and one rear—140 and 150 per storage chest 100), according to an embodiment, and the front and rear panels 140 and 150 may be the same size or may vary in size, including length, width, and thickness dimensions. In an embodiment, the front and rear panels 140 and 150 are the same size, each having a width spanning almost an entire length of the front (or rear) of the storage chest 100 and a height constituting the height or depth of the storage chest 100.

The side panels 130 according to an embodiment are configured to couple to the base 110 of the storage chest 100 at each of its opposite shorter sides in an embodiment where the base 110 has two short opposite sides (or at any two opposite sides substantially perpendicular to the front and rear of the storage chest 100 in other embodiments). Each side panel 130, in this embodiment, is centered along a length of the respective side and extends along a height or depth of the storage chest 100 constituting a height or depth of the storage chest 100 along its sides. The side panels 130 and the front and rear panels 140 and 150, according to this embodiment, are the same height. The panels 130, 140, and 150, according to other embodiments, may have different heights. The storage chest 100 has at least one side panel 130 on each of its opposite sides (i.e., at least two side panels 130 per storage chest 100), according to an embodiment, and the side panels 130 may be the same size or may vary in size, including length, width, and thickness dimensions. In an embodiment, the side panels 130 are the same size, each having a width spanning almost an entire side of the storage chest 100 and a height constituting the height or depth of the storage chest 100.

The side panels 130, according to an embodiment, are interposed between the rails 120 such that at least one rail is adjacent each side of each side panel 130. Accordingly, the side elevations of the storage chest 100, in an embodiment, each includes a side panel 130 centered along a length of the side, and a rail 120 adjacent either end of the panel 130 spaced less than or equal to 4 inches from the panel 130. The side panels 130 are each configured to couple to the base 110 at the edge of each of the respective short sides (in an embodiment where the base 110 has long and short sides), or are each configured to couple to the base 110 at two opposite sides of the base 110 in embodiments where the base shape is non elongated or rectangular. The side panels 130 can be coupled to the base 110 in any manner known and appreciated by those skilled in the art. For example, according to some embodiments, the side panels 130 may be coupled to the base 110 using fasteners 220 including screws, nails, bolts, glue, or putty. In an embodiment, the side panels 130 may be fastened to the base 110 using fasteners 220 secured from a bottom surface of the base 110 into each side panel 130. The side panels 130, according to these embodiments, are configured to be placed in elevation and assembled with the base 110 such that each panel 130 spans a portion of a length of each short side of the base 110, constituting a portion of the side height or depth of the storage chest 100 when viewed in elevation.

The base 110 is configured to receive a plurality of rails 120 surrounding each of the side panels 130 and extending to the front and rear panels 140 and 150, such that the entire perimeter of the base 110 is enclosed by rails 120 and panels 130, 140, and 150. According to an embodiment, the rails are coupled to the base 110 at the openings 200 in the base 110. In some embodiments, the openings 200 may extend all the way through the base 110. In other embodiments, the openings 200 may only extend partially through the rails, for example, only at a top surface of the base 110. The rails 120 each have a top 122 and a bottom 121, the bottom 121 of each rail 120 being coupled to the base 100 at a respective opening 200. According to an embodiment, each respective rail 120 may be inserted through or into a respective opening 200 of the base 110 and fastened thereto. The rails 120 may be fastened to the base 120 in any manner known and appreciated by those skilled in the art. For example, according to some embodiments, the rails 120 may be coupled to the base 110 using fasteners 220 including screws, nails, bolts, glue, or putty. In an embodiment, the rails 120 may be fastened to the base 110 using a fastener 220 secured from a bottom surface of the base 110 into each rail 120. The rails 120, according to these embodiments, are configured to be placed in elevation through or into the respective opening 200 of the base 110 such that each rail 120 spans a portion of a length of each short side of the base 110, constituting a portion of the side height or depth of the storage chest 100 when viewed in elevation. In an embodiment, the storage chest 100 has twenty rails 120 configured in a pattern, with ten rails 120 spanning each side and having a side panel 130 interposed between each set of five rails 120 such that a first rail 120 is adjacent a side panel 130 and a fifth rail 120 in the series is adjacent either the front panel 140 or the rear panel 150 at each side. In other embodiments, the storage chest 100 may include more or less than twenty rails 120, and the rails 120 may be symmetrically placed or may be asymmetrically placed in a pattern along the perimeter of the base 110. In some embodiments, the storage chest 100 may include sixteen rails 120 arranged with eight per side, having a side panel 130 centered between four rails 120 at each side. In another embodiment, the storage chest 100 may include twelve rails 120 arranged with six per side, having a side panel 130 centered between three rails 120 at each side. In yet another embodiment, the storage chest 100 may include twenty-four rails 120 arranged with 12 per side, having a side panel 130 centered between six rails 120 at each side. The invention is not limited to these embodiments, however, and the rails 120 may be arranged in any suitable manner known and appreciated by those skilled in the art.

The storage chest 100 according to embodiments of the present invention further includes a top support ring 160. The top support ring 160, according to an embodiment, is coupled to the storage chest 100 at the rails 120, the side panels 130, the front panel 140, and the rear panel 150 from a top of the storage chest such that the top support ring 160 covers a top surface of the storage chest 100. In these embodiments, the top support ring 160 is sized to complement the base 110 such that an outer perimeter of the stop support ring is at least the same size and dimensions as the base 110 (or larger). The top support ring 160 has a thickness $t_r$ that exceeds at least a diameter $\theta_R$ of the rails 120 or thickness $t_P$ of each panel 130, 140, and 150.

The top support ring 160 according to these embodiments includes a series of openings 210 corresponding to the openings 200 in the base 110 to receive the rails 120. In an embodiment, the openings 210 are through openings. In another embodiment, the openings 210 are partial openings and only extend partly through a depth of the top support ring 160. In an embodiment, the top support ring 160 is configured to couple to the storage chest 100 at a bottom of the top support ring 160 at a top 122 of the rails 120, side panels 130, front panel 140, and rear panel 150. According to an embodiment, the rails are coupled to the top support ring 160 through the openings 210 in the top support ring 160. In these embodiments, the bottom 121 of each rail 120 is coupled to the base 100 at a respective opening 200, and the top 122 of the rail 120 is coupled to the top support ring 160. According to an embodiment, each respective rail 120 may be inserted through a respective opening 210 of the top support ring 160 and then into or through the respective opening 200 of the base 110 and fastened thereto.

The rails 120 may be fastened to the base 120 and/or the top support ring in any manner known and appreciated by those skilled in the art. For example, according to some embodiments, the rails 120 may be coupled to the base 110 and/or the top support ring 160 using fasteners 220 including screws, nails, bolts, glue, or putty. In an embodiment, the rails 120 may be fastened to the base 110 using a fastener 220 secured from a bottom surface of the base 110 into each rail 120, and may be fastened to the top support ring 160 using a fastener 220 secured from a top surface of the top support ring 160. The fastener 220 in this embodiment may be covered or further secured with a putty, tape, or other adhesive coating or covering at the top surface of the top support ring 160. The rails 120, according to these embodiments, are configured to be placed in elevation through or into the respective opening 200 of the base 110 and capped at the top 122 with the top support ring 160 such that each rail 120 spans a portion of a length of each short side of the base 110, and together with the base 110 and top support ring 160 constitutes the height or depth of the storage chest 100 when viewed in elevation. The side panels 130, front panel 140, and rear panel 150 may similarly be coupled to the top support ring 160 from the top surface of the top support ring 160 using fasteners 220 including screws, nails, or bolts, or from a bottom surface of the top support ring 160 using fasteners 220 such as glue or putty. In other embodiments, the panels 130, 140, and 150 may be coupled to the top support ring 160 in any manner suitable for assembling a storage chest 100 as known appreciated by those in the art.

Figure 1:
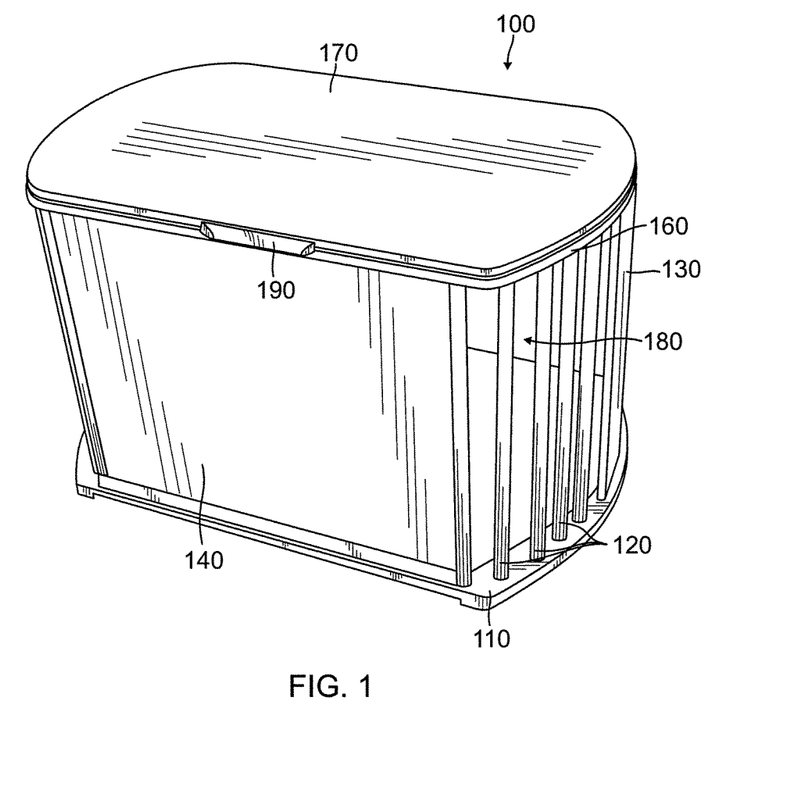
FIG. 1 is a perspective view of a storage chest having its cover in a closed position according to an embodiment of the present invention.
Figure 2:
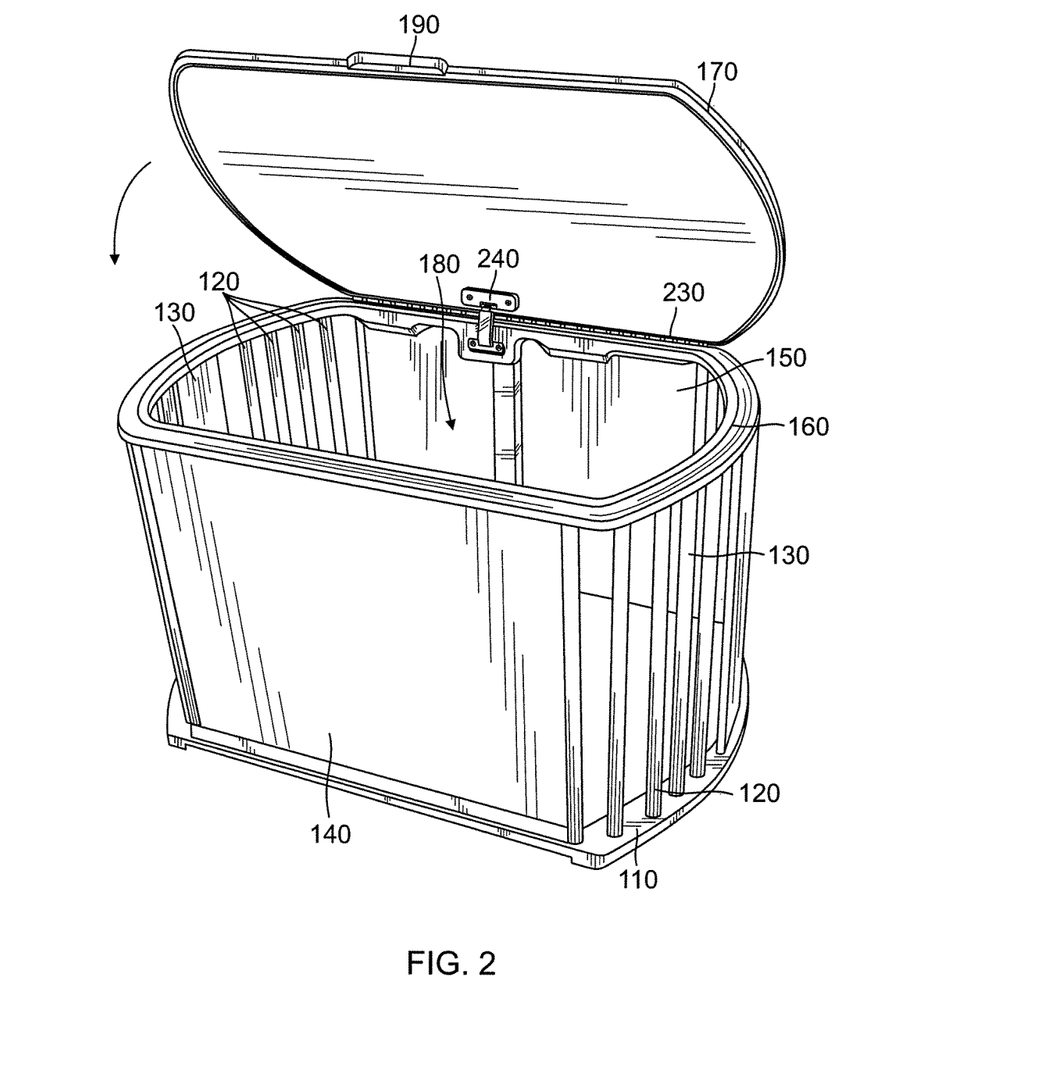
FIG. 2 is a perspective view of the storage chest having its cover in an open position according to an embodiment of the present invention.

The storage chest 100 according to embodiments of the present invention further includes a cover 170. The cover 170, according to these embodiments, may be shaped to cover or complement the outer perimeter of the top support ring 160 and/or the base 110 such that in a closed position the cover extends entirely over the top support ring 160. The cover 170 may be movably coupled to the storage chest 100 and configured to move from a closed position fully extending over the top support ring 160 and substantially parallel to the base 110 to cover the rails 120 and panels 130, 140, and 150 to an open position exposing an interior 180 of the storage chest 100. The cover 170, according to an embodiment, may further include a handle 190 coupled to the cover 170 to allow for opening and closing of the cover 170. The handle 190 may be coupled to the cover 170 in any suitable manner known and appreciated by those skilled in the art, including using fasteners 220 including screws, nails, bolts, glue, or putty. The cover 170, in these embodiments, is coupled to the storage chest 100 with a first hinge 230 connecting the cover 170 at a rear edge to the top support ring 160 adjacent the rear panel 150 such that the cover 170 can be opened from a front of the storage chest 100 in a direction toward the rear of the storage chest 100. In additional embodiments, the storage chest 100 may further include a second hinge 240 (for example, as shown in FIG. 2), the second hinge being configured to allow the cover 170 to temporarily stay fixed in an open position, the second hinge 240 being coupled to the cover 170 and the top support ring 160 or the rear panel 150 directly. The hinges 230 and 240 may be coupled to the cover 170 and the top support ring 160 and/or rear panel 150 in any suitable manner known and appreciated by those skilled in the art, including using fasteners 220 including screws, nails, bolts, glue, or putty.

In a closed position, the interior 180 of the storage chest 100 and the contents within it can be viewed and, in some embodiments, manipulated through the openings between the rails 120 and/or the rails and the panels 130, 140, and 150. The storage chest 100, according to the embodiments of the present invention, is configured such that its contents and the interior 180 of the storage chest 100 can be viewed in this manner while the cover 170 is in a closed position. These embodiments allow for viewing and use of the storage chest 100 without the risk of users falling into the storage chest 100, or otherwise injuring themselves or others in opening and closing the cover 170, having limbs or other body parts caught between the cover 170 and the support ring 160, or being caught inside the storage chest 100 without being able to exit or call for help. The bar 120 spacing allows for added safety features including ventilation, sound, and a physical bar from entering or falling into the storage chest 100.

Figure 3:
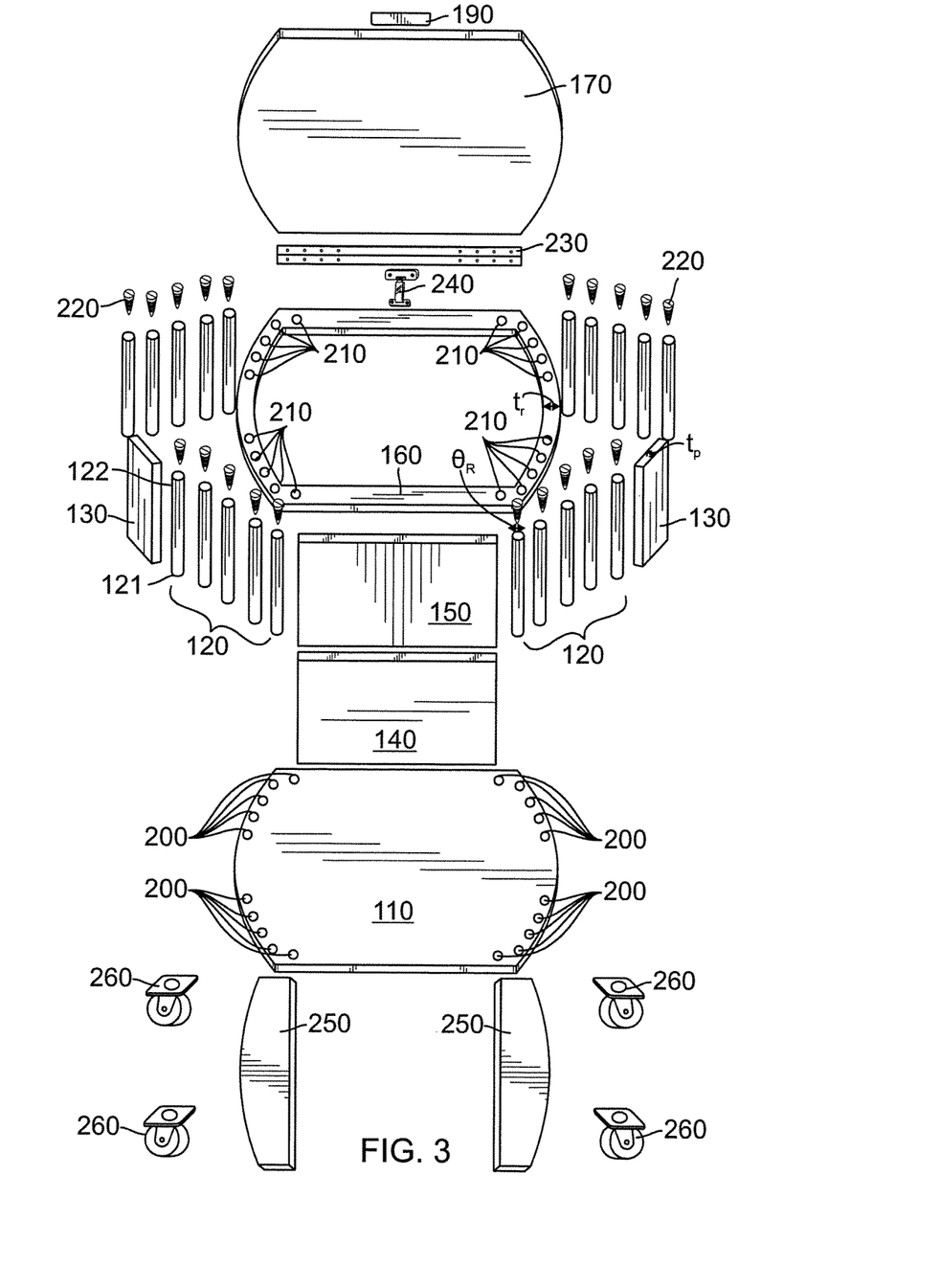
FIG. 3 is an exploded perspective view of the storage chest illustrated in FIGS. 1 and 2.
Figure 4:
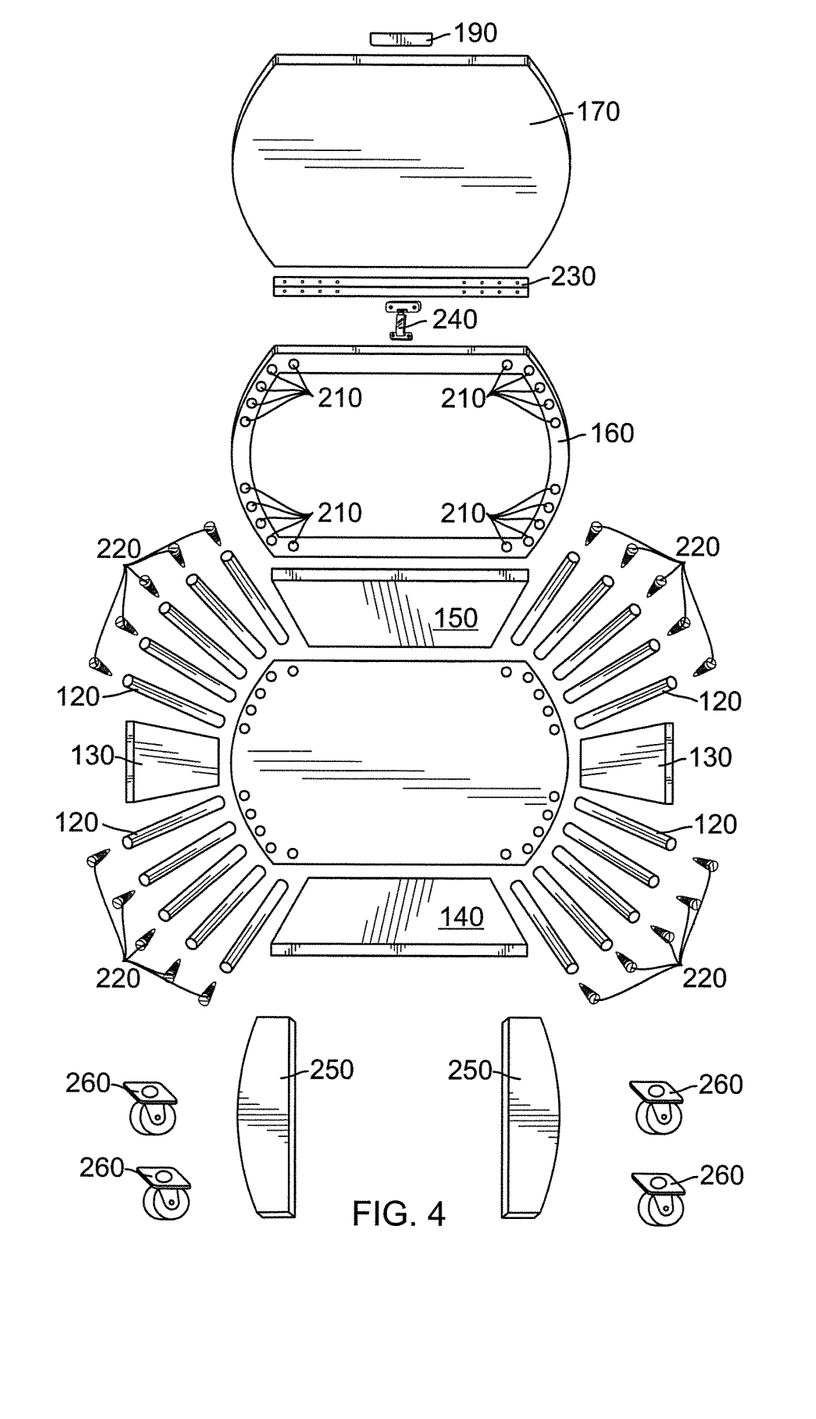
FIG. 4 is an exploded top view of the storage chest illustrated in FIGS. 1 and 2 as configured for assembly.
Figure 5:
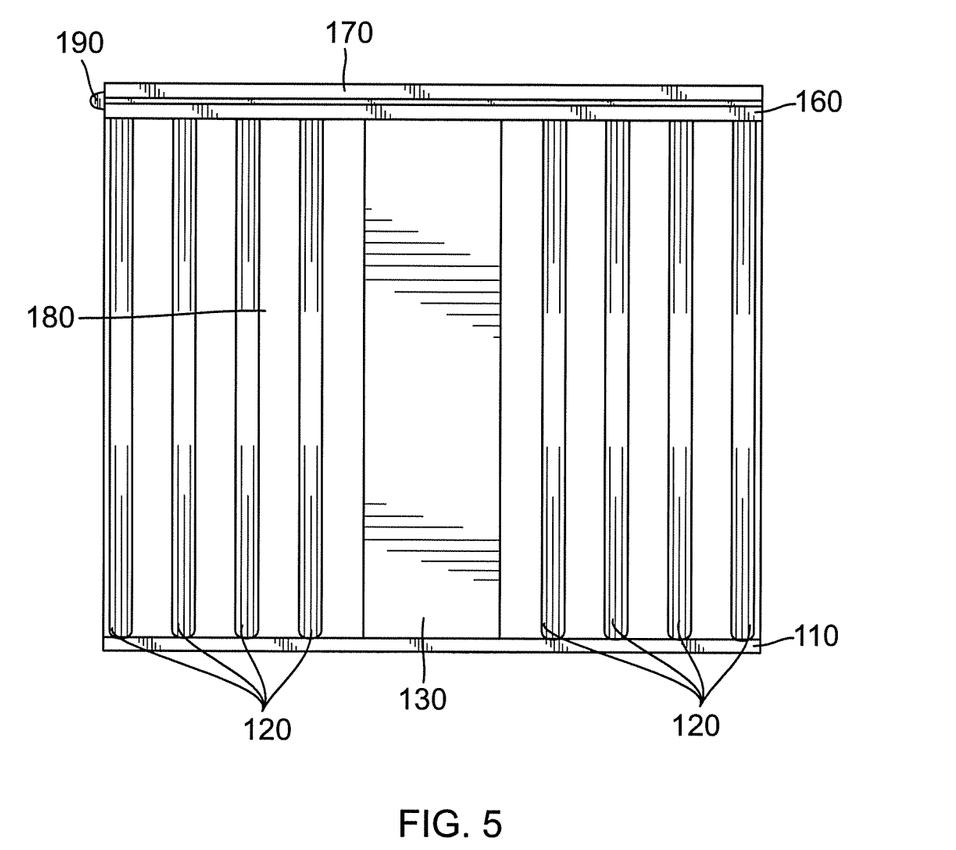
FIG. 5 is a side profile view of the storage chest illustrated in FIG. 1.

The storage chest 100, according to an embodiment, further includes a caster support 250 (as shown in FIG. 3) at the bottom of the base 110 spanning a side of the storage chest. The caster support 250 can have any size and/or shape suitable to support casters 260 coupled to the storage chest 100 and able to support the storage chest 100 even in a filled condition. The caster supports 250, according to an embodiment, are configured to the bottom surface of the base 110 with a plurality of casters 260 coupled to a bottom of each respective caster support 250 such that the storage chest 100 is movable as a unit and can roll or glide using the casters 260. The casters 260, according to an embodiment, are coupled to the base 110 or the caster supports 250 in any suitable manner known and appreciated by those skilled in the art, including using fasteners 220 including screws, nails, bolts, glue, or putty. The storage chest 100, according to these embodiments, includes at least two casters, and may include three or four casters. In other embodiments, the storage chest 100 may include more than four casters.

The storage chest 100 according to embodiments of the present invention, including its base 110, the rails 120, each side panel 130, the front panel 140, the rear panel 150, the top support ring 160, the cover 170, and the caster supports 250, are made of a lightweight durable material. In some embodiments, the lightweight durable material includes plywood, reclaimed wood, reinforced polyurethane foam, particle board, composite wood or lumber, or other reinforced building materials. In some embodiments, the base 110, the rails 120, each side panel 130, the front panel 140, the rear panel 150, the top support ring 160, the cover 170, and the caster supports 250 of the storage chest 100 are all made of the same material. In other embodiments, the base 110, the rails 120, each side panel 130, the front panel 140, the rear panel 150, the top support ring 160, the cover 170, and the caster supports 250 may be made of different materials. The use of lightweight durable materials allows the storage chest 100 to be both durable and lightweight such that it can be easily and safely handled and moved, even without casters 250. In an embodiment, the the base 110, the rails 120, each side panel 130, the front panel 140, the rear panel 150, the top support ring 160, the cover 170, and the caster supports 250 are made of plywood. The storage chest 100 is not limited to these embodiments, and the base 110, the rails 120, each side panel 130, the front panel 140, the rear panel 150, the top support ring 160, the cover 170, and the caster supports 250 may be made of any suitable material known and appreciated by those of skill in the art.

Still further, while a storage chest may be described in this specification with particular dimensions that have proven useful for a broad range of applications, it should be apparent to one of ordinary skill in the art that the apparatus described may be scaled up or down, made in other geometries, or modified in other obvious and insignificant ways to accommodate different situations, and the invention is not to be limited to the specific embodiments described here.

While this invention has been described in detail with particular references to embodiments, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "vertical," "horizontal," "top," "bottom," "middle," and similar have been used herein to describe a spatial relationship of one element to another, it should be understood that these terms are intended to encompass different orientations of the various elements and components of the invention in addition to the orientation depicted in the figures. Additionally, as used herein, the term "substantially," "about," "approximately," and similar are used as terms of approximation and not as terms of degree, and are intended to account for the inherent deviations in measured or calculated values that would be recognized by those of ordinary skill in the art. Moreover, the tasks described above may be performed in the order described or in any other suitable sequence. Instead, for each embodiment, one or more of the tasks described above may be absent and/or additional tasks may be performed. Furthermore, as used herein, when a component is referred to as being "on" another component, it can be directly or indirectly on the other component, meaning, for example, intervening layers, regions, or components may also be present. Moreover, when a component is referred to as being "coupled" to another component, it can be directly attached or connected to the other component, or other intervening components may also be present therebetween.

While the invention has been described in connection with certain embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A storage chest comprising:
    a continuous base having two parallel sides and two rounded sides opposite each other, the two rounded sides being continuously rounded between the two parallel sides;
    a peripheral wall extending from the base and defining an interior of the chest, the peripheral wall comprising:
        a rail member extending from one of the rounded sides of the base and defining an opening in the peripheral wall providing access between an area outside the chest to the interior of the chest; and
        a front panel and a rear panel at the parallel sides of the base, respectively, at least one of the front and rear panels being wider than the rail member; and
    a cover hingedly connected to the peripheral wall opposite the base and configured to close the chest,
    wherein the front panel and the rear panel extend from the base toward the cover.

2. The storage chest of claim 1, wherein the peripheral wall comprises a plurality of rail members extending from the base.

3. The storage chest of claim 1, further comprising a continuous top support ring coupled to the peripheral wall below the cover and having a closed periphery.

4. The storage chest of claim 1, wherein the peripheral wall further comprises a side member at each remaining opposite side of the base, the side members being wider than the rail members.

5. The storage chest of claim 1, wherein the base defines a series of openings configured to receive the rail members of the peripheral wall, the base being coupled to the peripheral wall at the openings.

6. The storage chest of claim 1, wherein the base, the peripheral wall, the rail member, and the cover comprise a plywood, reclaimed wood, reinforced polyurethane foam, particle board, composite wood or lumber, or other reinforced building material.

7. A storage chest comprising:
    a base extending in a first direction and a second direction;
    a first plurality of rails and a second plurality of rails, each of the first and second pluralities of rails extending from a first side of the base;
    a first side panel extending from the first side of the base in a third direction transverse the first and second directions, entirely disposed between the first and second pluralities of the rails on the first side of the base, and having a width in the first direction that is greater than a width or diameter of at least some of the rails;
    a front panel extending from the base in the third direction and disposed between the side panels; and
    a rear panel extending from the base in the third direction, spaced from the front panel, and disposed between a pair of the rails,
    wherein the side, front, and rear panels and the rails define openings providing access from an area exterior to the chest to an interior of the chest.

8. The storage chest of claim 7, further comprising a cover disposed on the side, front, and rear panels and the rails opposite the base and configured to close the chest.

9. The storage chest of claim 8, wherein the side, front, and rear panels, the base, the rails, and the cover comprise a plywood, reclaimed wood, reinforced polyurethane foam, particle board, composite wood or lumber, or other reinforced building material.

10. The storage chest of claim 7, further comprising a top support ring coupled to the side, front, and rear panels and the rails from a top of the storage chest, wherein the top support ring defines a series of first openings, each of the first openings being configured to receive a respective one of the plurality of rails at a top thereof, and wherein the base defines a complementary series of second openings, each of the second openings being configured to receive a respective one of the plurality of rails at a bottom thereof.

11. A storage chest comprising:

a continuous base comprising a front side, a rear side opposite the front side, and two curved sides connecting the front and rear sides to each other;

a plurality of rails coupled to the base at the curved sides;

a side panel at each of the two curved sides and coupled to the base at least between some of the rails of the plurality of rails;

a front panel and a rear panel coupled to the front and rear sides, respectively, of the base, each of the side panels, the front panel, and the rear panel being wider than each of the rails;

a continuous top support ring coupled to the rails, the side panels, the front panel, and the rear panel and having a closed periphery; and a cover movably coupled to the storage chest and configured to move from a closed position fully extending over the top support ring of the storage chest and opposite the base to an open position exposing an interior of the storage chest, wherein the base defines a series of blind openings, each of the blind openings being configured to receive a respective one of the plurality of rails at a bottom of each rail.

12. The storage chest of claim 11, wherein the plurality of rails comprises twenty rails configured in a pattern, with ten rails spanning each of the two sides and having one of the side panels interposed between each set of five rails such that a first rail is adjacent the one of the side panels and a fifth rail is adjacent either the front panel or the rear panel at each side; and wherein each of the rails is spaced no greater than approximately four inches apart from its adjacent rail or side, front, or rear panel.

13. The storage chest of claim 12, wherein each of the rails is spaced approximately two inches apart from its adjacent rail or side, front, or rear panel.

14. The storage chest of claim 11, wherein the base, plurality of rails, each side panel, the front panel, the rear panel, and the cover comprise a lightweight durable material.

15. The storage chest of claim 14 wherein the lightweight durable material comprises plywood, reclaimed wood, reinforced polyurethane foam, particle board, composite wood or lumber, or other reinforced building materials.

16. The storage chest of claim 11, wherein the continuous top support ring is coupled to each of the plurality of rails, each of the side panels, the front panel, and the rear panel from a top of the storage chest, wherein the top support ring defines a series of blind openings, each of the blind openings being configured to receive a respective one of the plurality of rails at a top of each rail, and wherein the plurality of rails, each of the side panels, the front panel, and the rear panel are coupled to the top support ring with a fastening mechanism.

17. The storage chest of claim 16, wherein the fastening mechanism comprises a screw, a nail, a bolt, glue, or putty.

18. The storage chest of claim 11, wherein the cover is movably coupled to the storage chest at the rear panel with a first hinge; and the cover further comprises a handle configured to assist with moving the cover between the open and the closed position.

19. The storage chest of claim 18, wherein the cover further comprises a second hinge configured to allow the cover to temporarily stay fixed in the open position, the second hinge being coupled to the cover and the rear panel.

20. The storage chest of claim 18, further comprising:

a caster support at a bottom of the base spanning the two sides of the storage chest; and a plurality of casters configured to be coupled to a bottom of each respective caster support such that the storage chest is movable as a unit.

* * * * *